United States Patent
Kim

(10) Patent No.: US 8,599,452 B2
(45) Date of Patent: *Dec. 3, 2013

(54) IMAGE READING APPARATUS AND METHOD OF CONTROLLING THE SAME

(75) Inventor: Young Min Kim, Suwon-si (KR)

(73) Assignee: SAMSUNG Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 13/433,351

(22) Filed: Mar. 29, 2012

(65) Prior Publication Data

US 2012/0243062 A1    Sep. 27, 2012

Related U.S. Application Data

(63) Continuation of application No. 12/104,654, filed on Apr. 17, 2008, now Pat. No. 8,169,674.

(30) Foreign Application Priority Data

Jul. 24, 2007    (KR) .............................. 10-2007-74168

(51) Int. Cl.
*H04N 1/46*    (2006.01)

(52) U.S. Cl.
USPC ........... 358/504; 358/406; 358/474; 358/496; 358/498; 358/505

(58) Field of Classification Search
None
See application file for complete search history.

(56) References Cited

U.S. PATENT DOCUMENTS

2005/0094226 A1    5/2005    Burch

FOREIGN PATENT DOCUMENTS

| CN | 1612583 | 5/2005 |
|---|---|---|
| CN | 1737695 | 2/2006 |
| CN | 1972349 | 5/2007 |
| JP | 11069041 | 3/1999 |
| JP | 2003309703 | 10/2003 |
| JP | 2004-187144 | 7/2004 |
| JP | 2005326730 | 11/2005 |

OTHER PUBLICATIONS

Machine Translation of JP2003-309703.*
Chinese Office Action Issue don May 4, 2012 in CN Patent Application No. 200810098511.6.
Japanese Office Action Issued on Jun. 20, 2012 in JP Patent Application No. 2008-141276.

* cited by examiner

*Primary Examiner* — Richard Zhu
(74) *Attorney, Agent, or Firm* — Stanzione & Kim, LLP

(57) ABSTRACT

An image reading apparatus includes an automatic document feeder, a first reading unit to read a first side of a document fed by the automatic document feeder and to function as a main reading unit, a second reading unit to read a second side of the document fed by the automatic document feeder; and a control unit to operate the first and second reading units in order to perform an ADF two-sided reading mode. The control unit determines a point in time when the main reading unit is changed, based on a frequency in use of the ADF two-sided reading mode, and changes the main reading unit to the second reading unit at the determined point in time.

7 Claims, 5 Drawing Sheets

IMAGE READING APPARATUS AND METHOD OF CONTROLLING THE SAME

CROSS-REFERENCE TO RELATED APPLICATIONS

This application is a Continuation Application of prior application Ser. No. 12/104,654, filed on Apr. 17, 2008 now U.S. Pat. No. 8,169,674 in the United States Patent and Trademark Office which claims the benefit of Korean Patent Application No. 2007-74168, filed on Jul. 24, 2007 in the Korean Intellectual Property Office, the disclosure of which is incorporated herein by reference in its entirety.

BACKGROUND OF THE INVENTION

1. Field of the Invention

The present general inventive concept relates to an image reading apparatus, and, more particularly, to an image reading apparatus capable of equally using a plurality of reading units to read image information from a document, and a method of controlling the same.

2. Description of the Related Art

An image reading apparatus reads image information recorded on a document and is mounted in a machine such as a scanner, a digital copier or a multi-function machine.

A method of reading both sides of a document in an image reading apparatus may be classified into two methods. One is a method of reading a first side of a transported document via a reading unit, changing a transport direction of the document via a document direction changing device, reversing the first side and a second side of the document via a duplex path, and reading the second side of the document. Such a method is advantageous in that both sides of the document can be read using one reading unit, but is disadvantageous in that it takes significant time to read the both sides of the document.

A second method is reading both sides of a document by mounting a first reading unit to read a first side of the document and opposite a second reading unit to read a second side of the document. Such a method is advantageous in that the both sides of the document can be simultaneously read without unnecessarily circulating the document and thus a two-sided reading operation can be performed with high speed.

An example of the image reading apparatus employing the latter method is disclosed in Japanese Unexamined Patent Application Publication No. 2004-187144. The disclosed image reading apparatus includes first and second reading units respectively to read an upper side and a lower side of a document fed by an automatic document feeder. In a one-sided reading mode in which only one side of the document is read, the first reading unit reads the document and, in a two-sided reading mode in which both sides of the document are read, the first reading unit and the second reading unit read the document. Since the first reading unit is used in both the one-side reading mode and the two-sided reading mode, the first reading unit may be called a main reading unit which performs a main function when the document is read. Although the lifetime of the first reading unit is set to be equal to that of the second reading unit, the first reading unit 140 expires earlier than the second reading unit 150 because of the difference in work load.

However, since the conventional image reading apparatus is not built to take into account that the effective lifetime of the first reading unit is shorter than that of the second reading unit, the following problems may be caused. First, since the lifetimes of the first reading unit and the second reading unit expire at different points in time, it is cumbersome for a user to repair each reading unit whenever the replacement of such is necessary. Thus, the user may distrust the quality of the product.

If the document is read using the second reading unit which has been used less frequently than the first reading unit, better reading quality can be obtained. However, since the document is read using the first reading unit which has been used more frequently than the second reading unit, reading quality may deteriorate. In addition, when both sides of the document are read, an image read by the first reading unit is different from an image read by the second reading unit in quality.

SUMMARY OF THE INVENTION

The present general inventive concept provides an image reading apparatus capable of changing a main reading unit at an appropriate time such that a plurality of reading units can be used with substantially similar expiration times, and a method of controlling the same.

Additional aspects and utilities of the present general inventive concept will be set forth in part in the description which follows and, in part, will be obvious from the description, or may be learned by practice of the general inventive concept.

The foregoing and/or other aspects and utilities of the present general inventive concept can be achieved by providing an image reading apparatus including: an automatic document feeder; a first reading unit to read a first side of a document fed by the automatic document feeder and to function initially as a main reading unit; a second reading unit to read a second side of the document fed by the automatic document feeder; and a control unit to change the main reading unit from the first reading unit to the second reading unit if the number of times $L_a$ of usage of the first reading unit reaches a reference value.

The control unit may compare the number of times $L_a$ of usage of the first reading unit with a predicted number of lifetime usages $L_t$ of the first reading unit and change the main reading unit to the second reading unit if it is determined that the number of times $L_a$ of usage of the first reading unit reaches at least a predetermined percentage of the predicted lifetime usages of the first reading unit.

The control unit may determine whether the main reading unit is changed, taking into account the frequencies of the first reading unit and the second reading unit.

The control unit may include an ADF two-sided reading mode to read the first side and the second side of the document fed by the automatic document feeder using the first reading unit and the second reading unit, respectively, and the control unit may change the main reading unit to the second reading unit if the number of times $L_a$ of usage of the first reading unit satisfies the following equation in a relationship between the predicted lifetime usages $L_t$ of the first reading unit and a frequency $F_d$ in use of the ADF two-sided reading mode.

$$L_a \geq L_t[1-(F_d+\alpha)], (\alpha \text{ is a constant and } 0 < F_d + \alpha < 1)$$

The image reading apparatus may further include a flat panel on which a document to be read is laid, the control unit may include an ADF two-sided reading mode to read the first side and the second side of the document using the first reading unit and the second reading unit and a flat-panel reading mode to read the document laid on the flat panel using the first reading unit, and the control unit may change the main reading unit to the second reading unit if the number of times $L_a$ of usage of the first reading unit satisfies the following equation in a relationship among the predicted lifetime usages $L_t$ of the first reading unit, a frequency $F_d$ in use of the ADF two-sided reading mode and a frequency $F_f$ in use of the flat-panel reading mode.

$$La \geq Lt[1-(Fd+Ff)], (0<Fd+Ff<1)$$

The image reading apparatus may further include a display unit to display an operation state of the image reading apparatus, and the control unit may display information on the change of the main reading unit on the display unit before the main reading unit is changed to the second reading unit.

The image reading apparatus may further include an input unit having a main reading unit changing unit to allow a user to input a command to change the main reading unit.

The image reading apparatus may further include a display unit to display an operation state of the image reading apparatus. A document feed tray on which the document fed by the automatic document feeder is laid, and the control unit may display information on a direction of a side to be read in the document laid on the document feed tray when the main reading unit is changed to the second reading unit.

The foregoing and/or other aspects and utilities of the present general inventive concept can also be achieved by providing a method of controlling an image reading apparatus including a first reading unit to read a first side of a transported document and to function as a main reading unit and a second reading unit to read a second side of the transported document, the method including: determining whether the number of times $L_a$ of usage of the first reading unit reaches a reference value and determining whether the main reading unit is changed to the second reading unit according to the determined result.

At this time, the number of times $L_a$ of usage of the first reading unit may be compared with a predicted lifetime usage $L_t$ of the first reading unit and the main reading unit may be changed to the second reading unit if it is determined that the number of times $L_a$ of usage of the first reading unit reaches at least a predetermined percentage of the predicted lifetime usages of the first reading unit.

When the main reading unit is changed may be determined taking into account frequencies in use of the first reading unit and the second reading unit.

A frequency $F_d$ in use of an ADF two-sided reading mode to read the first side and the second side of the document using the first reading unit and the second reading unit may be computed, and the main reading unit may be changed to the second reading unit if the number of times $L_a$ of usage of the first reading unit satisfies the following equation in a relationship between the predicted lifetime usage $L_t$ of the first reading unit and the frequency $F_d$ of using the ADF two-sided reading mode.

$$La \geq Lt[1-(Fd+\alpha)], (\alpha \text{ is a constant and } 0<F_d+\alpha<1)$$

The frequency $F_d$ used in an ADF two-sided reading mode to read the first side and the second side of the document using the first reading unit and the second reading unit and a frequency $F_f$ using a flat-panel reading mode to read the document laid on a flat panel using the first reading unit may be computed, and the main reading unit may be changed to the second reading unit if the number of times $L_a$ of usage of the first reading unit satisfies the following Equation in a relationship among the predetermined lifetime $L_t$ of the first reading unit, the frequency $F_d$ in use of the ADF two-sided reading mode and the frequency $F_f$ used in the flat-panel reading mode.

$$La \geq Lt[1-(Fd+Ff)], (0<Fd+Ff<1)$$

Information on the change of the main reading unit may be displayed on a display unit before the main reading unit is changed to the second reading unit.

The main reading unit may be changed to the second reading unit when a command of a user is inputted.

Information indicating which of an upper side and a lower side of the document laid on a document feed tray becomes a side to be read may be displayed on a display unit when the main reading unit is changed to the second reading unit.

The foregoing and/or other aspects and utilities of the present general inventive concept can also be achieved by providing a method of controlling an image reading apparatus including a first reading unit to read a first side of a transported document and to function initially as a main reading unit, and a second reading unit to read a second side of the transported document. The method includes predetermining a predicted total usage value $L_t$ for the first reading unit, electronically calculating a frequency $F_d$ of use for an ADF two-sided reading mode to read the first side and the second side of the document using the first reading unit and the second reading unit, respectively, electronically calculating a frequency $F_f$ of use for a flat panel reading mode to read the first side of the document using the first reading unit, determining whether the total usage $L_a$ of the first reading unit has exceeded a threshold value according to the formula $$La \geq Lt[1-(Fd+Ff)], (0<Fd+Ff<1)$$

The second reading unit may also have a predicted total usage value $L_t$, so that if the main reading unit is changed to the second reading unit when the first reading unit has only slightly exceeded the threshold value, the first and second reading units will expire at substantially similar times.

The foregoing and/or other aspects and utilities of the present general inventive concept can also be achieved by providing a method of controlling an image reading apparatus including a first reading unit to read a first side of a transported document and to function initially as a main reading unit and a second reading unit to read a second side of the transported document, is provided. The method includes predetermining a predicted total usage value $L_t$ for the first reading unit, electronically calculating a frequency $F_d$ of use for an ADF two-sided reading mode to read the first side and the second side of the document using the first reading unit and the second reading unit, respectively, predetermining a constant $\alpha$ for use in electronic calculations with $F_d$, and determining whether the total usage $L_a$ of the first reading unit has exceeded a threshold value according to the formula $$La \geq Lt[1-(Fd+\alpha)], (0<Fd+\alpha<1).$$

The apparatus may have a flat-panel reading function performed by the first reading unit, regardless of the total usage value, $L_a$. The predetermination of $\alpha$ also takes into account such flat-panel reading function.

The foregoing and/or other aspects and utilities of the present general inventive concept can also be achieved by providing an image reading apparatus, including: an automatic document feeder, at least two reading units and a control unit to control which of the at least two reading units will be used during each document loading operation based on previous usages of each of the at least two reading units.

BRIEF DESCRIPTION OF THE DRAWINGS

These and/or other aspects and utilities of the present general inventive concept will become apparent and more readily appreciated from the following description of the embodiments, taken in conjunction with the accompanying drawings of which.

DETAILED DESCRIPTION OF THE PREFERRED EMBODIMENTS

Figure 1:
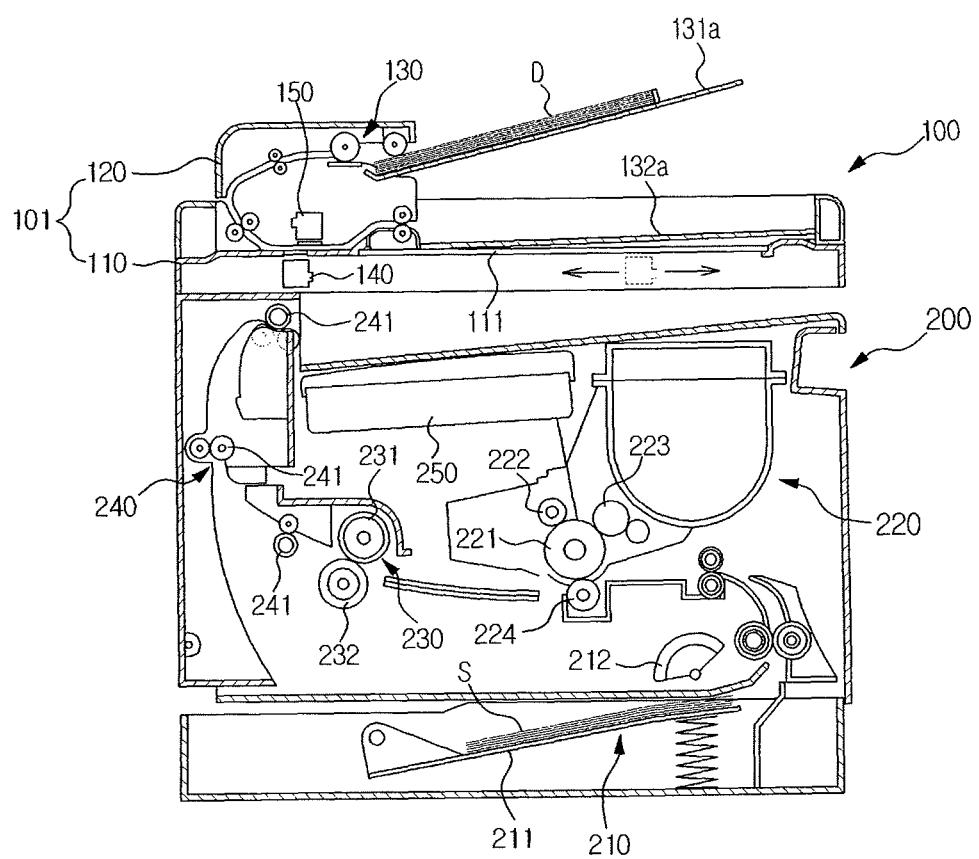
FIG. 1 is a view illustrating the configuration of a multi-function machine having an image reading apparatus according to an embodiment of the present-general inventive concept.

Reference will now be made in detail to the embodiments of the present general inventive concept, examples of which are illustrated in the accompanying drawings, wherein like reference numerals refer to the like elements throughout. The embodiments are described below in order to explain the general inventive concept by referring to the figures.

Figure 2:
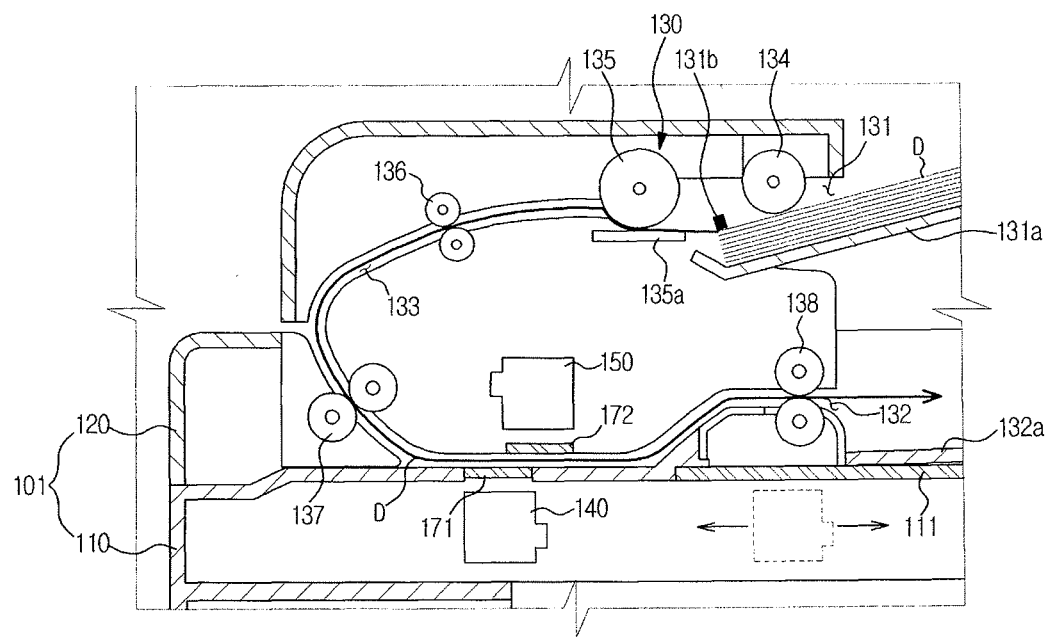
FIG. 2 is a view illustrating the configuration of the image reading apparatus according to the present general inventive concept.
Figure 3:
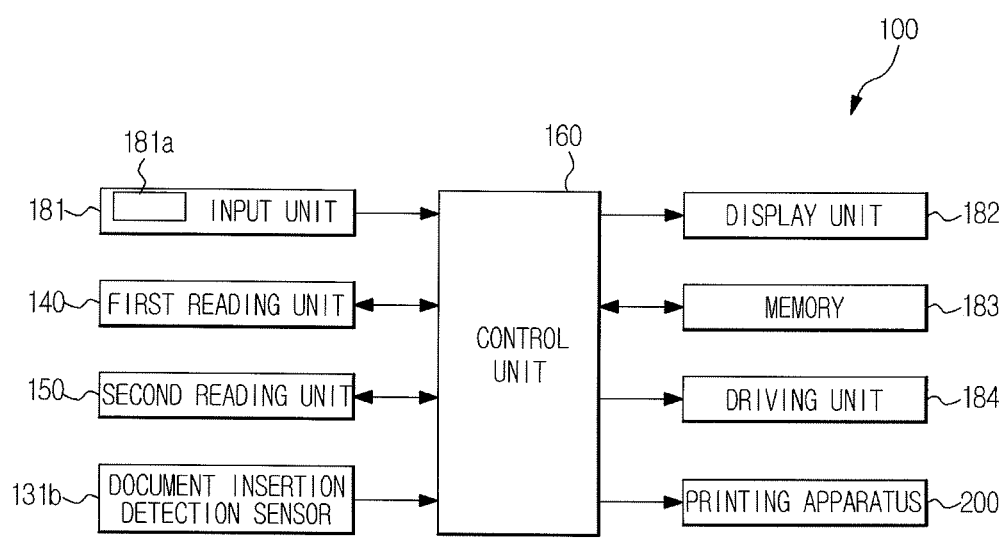
FIG. 3 is a block diagram illustrating the image reading apparatus according to the present general inventive concept.

FIG. 1 is a view illustrating the configuration of a multi-function machine having an image reading apparatus according to an embodiment of the present general inventive concept, FIG. 2 is a view illustrating the configuration of the image reading apparatus according to the general inventive concept, and FIG. 3 is a block diagram illustrating the image reading apparatus according to the general inventive concept.

As illustrated in FIG. 1, the multi-function machine includes an image reading apparatus 100 to read an image recorded on a document D and a printing apparatus 200 to print an image on a document S.

The printing apparatus 200 prints an image according to a signal inputted from the image reading apparatus 100 or inputted from an external apparatus such as a personal computer (PC). The printing apparatus 200 includes a document feed unit 210 to feed a document S which is a printable medium, a development unit 220 to develop an image on the document S, a fixing unit 230 to apply heat and pressure to the document S and fix the developed image to the document S, and an ejection unit 240 to eject the document on which the image is printed.

The document S loaded on a document tray 211 is picked up by a pickup roller 212 and is transported to the development unit 220. An electrostatic latent image is formed on the surface of a photosensitive drum 221, which is charged with a predetermined potential by a charging roller 222. The electrostatic latent image is developed to a toner image by a development roller 223 and is transferred onto document S by a transfer roller 224. The toner image transferred onto the document is fixed to the document S by heat and pressure when passing between a heating roller 231 and a pressurization roller 232 of the fixing unit 230, and the document passing through the fixing unit 230 is transported and ejected by an ejection roller 241.

As illustrated in FIGS. 2 and 3, the image reading apparatus 100 according to an embodiment of the present general inventive concept includes a reading apparatus main body 101 including a reading frame 110 and a cover 120, an automatic document feeder 130 which automatically feeds a document D such that a reading operation can be continuously performed, first and second reading units 140 and 150 to irradiate light onto a document D and read image information, and a control unit 160 to control the whole operation of the image reading apparatus 100 according to an input signal of a user and a predetermined program.

The first reading unit 140 and the second reading unit 150 irradiate light onto the document D, detect the light reflected from the document D, convert the amount of light into an electrical signal, and send the electrical signal to the control unit 160. The first reading unit 140 and the second reading unit 150 face each other with a document transporting path 133 interposed therebetween. More particularly, the first reading unit 140 is located below the document D fed by the automatic document feeder 130 to read image information from a first side of the document D, and the second reading unit 150 is located above the document D fed by the automatic document feeder 130 to read image information from a second side of the document D.

The cover 120 is rotatably coupled to the reading frame 110 so as to open and close the upper surface of the reading frame 110. The second reading unit 150 and the automatic document feeder 130 are mounted inside the cover 120.

The first reading unit 140 is mounted inside the reading frame 110, and a flat panel 111 and a first ADF glass 171 are mounted on the upper surface of the reading frame 110. The user can lay the documents D on the flat panel 111 one by one in order to read the documents D. The first reading unit 140 is moved along the flat panel 111 below the flat panel 111 to read the document D laid on the flat panel 111, and is located below the first ADF glass 171 to read the first side of the document D transported by the automatic document feeder 130.

The automatic document feeder 130 includes a document insertion port 131 through which a document D to be read is inserted, a document ejection port 132 through which the read document is ejected, the document transporting path 133 which is formed inside the cover 120 so as to transport the document, and rollers which are mounted on the document transporting path 133 so as to transport the document D.

The document insertion port 131 is formed at one side of the cover 120 and the document ejection port 132 is formed below the document insertion port 131. A document feed tray 131a and a document insertion detection sensor 131b, which detects whether a document D is inserted and outputs the detected result to the control unit 160, are provided in the vicinity of the document insertion port 131. Automatic document feeder 130 transports documents D on the document feed tray 131a. A document ejection tray 132a, on which the documents D ejected after the reading operation is completed are loaded, is provided in the vicinity of the document ejection port 132.

The document transporting path 133 has a C-shape. One end of the document transporting path 133 is connected to the document feed tray 131a via the document insertion port 131 and the other end thereof is connected to the document ejection tray 132a via the document ejection port 132. The first ADF glass 171 and a second ADF glass 172 are sequentially arranged on the reading path 133a such that the first reading unit 140 and the second reading unit 150 can read the image information recorded on the document D passing through the document transporting path 133. The first ADF glass 171 is mounted on the reading frame 110 at a position corresponding to the first reading unit 140 and the second ADF glass 172 is mounted on the cover 120 at a position corresponding to the second reading unit 150.

The document transporting rollers include a document pickup roller 134 to pick up the document D loaded on the document feed tray 131a, first to third transporting rollers 135, 136 and 137 to transport the document picked up by the document pickup roller 134 on the document transporting path 133, and an ejection roller 138 to eject the read document to the document ejection tray 132a. The first transporting roller 135, which is provided closest to the document pickup roller 134, separates the documents picked up by the document pickup roller 134 one by one. In order to separate the documents, a friction pad 135a is provided so as to be opposed to the first transporting roller 135.

The control unit 160 may operate both the first reading unit 140 and the second reading unit 150 to perform an ADF two-sided reading mode in which both sides of a document fed by the automatic document feeder 130 are read. The control unit 160 may operate either the first reading unit 140 or the second reading unit 150 to perform an ADF one-sided reading mode in which one side of document D fed by the automatic document feeder 130 is read. At this time, since both the two reading units 140 and 150 are used in the ADF two-sided reading mode, the reading unit used in the ADF one-sided reading mode becomes the main reading unit.

Here, the main reading unit is defined as the reading unit which is more frequently used when reading a document D. In general, the first reading unit 140 which is mounted below a document D to read a first side of document D becomes the main reading unit.

The control unit 160 may perform in a flat-panel reading mode in which a document D laid on the flat panel 111 is read using the first reading unit 140 which is the main reading unit. While the second reading unit 150 is used in only the ADF two-sided reading mode, the first reading unit 140 is used in the ADF two-sided reading mode, the ADF one-side reading mode and the flat-panel reading mode. Accordingly, the lifetime of the first reading unit 140 expires earlier than the second reading unit 150.

The control unit 160 determines whether the main reading unit is changed on the basis of the number of times, $L_a$, of usage of the first reading unit 140 (i.e. the number of documents read using the first reading unit) and changes the main reading unit to the second reading unit according to the determined result such that the first reading unit 140 and the second reading unit 150 are substantially equally used throughout the lifetime of the reading units. In other words, both reading units 140 and 150 should expire at substantially the same time provided second reading unit 150 becomes the main reading unit at the appropriate time. More particularly, the control unit 160 reads the number of times of usage of the first reading unit 140, which is the main reading unit, from a memory 183 (see FIG. 3) and changes the main reading unit to the second reading unit 150 if the number of times of usage reaches a predetermined reference value.

At this time, the control unit 160 compares the number of times $L_a$ of usage of the first reading unit 140 with a predetermined lifetime $L_t$ of the first reading unit 140 and changes the main reading unit to the second reading unit if it is determined that the number of times $L_a$ of usage of the first reading unit 140 reaches at least a predetermined percentage of the predicted lifetime usages $L_t$ of the first reading unit 140. For example, if the predicted lifetime $L_t$ of the first reading unit 140 is 50,000 sheets, the control unit 160 may change the main reading unit to the second reading unit 150 if the first reading unit 140 reads at least 25,000 documents which correspond to 50% (this percentage may be appropriately changed if necessary in design) of 50,000 documents.

By the above-described method, the first reading unit 140 and the second reading unit 150 can be equally used by changing the main reading unit at an appropriate point in time. However, in this method, since the point in time when the main reading unit is changed is determined according to the predetermined reference value without considering which reading mode is more frequently used by the user, there is a limitation. For example, any user may frequently use the ADF two-sided reading mode. In this case, even when the main reading unit is changed to the second reading unit 150, the first reading unit 140 is frequently used. In contrast, any user may infrequently use the ADF two-sided reading mode. In this case, when the main reading unit is changed to the second reading unit 150, the first reading unit 140 is not frequently used. Therefore, in the case where the ADF two-sided reading mode is frequently used, the main reading unit needs to be changed to the second reading unit 150 at an earlier point in time, compared with the case where the ADF two-sided reading mode is infrequently used.

Accordingly, the point in time when the main reading unit is changed can be determined in consideration of the frequencies in using the first reading unit 140 and the second reading unit 150.

Considering that the first reading unit 140 is used in both the ADF two-sided reading mode and the flat-panel reading mode when the main reading unit is changed to the second reading unit 150, the control unit 160 may change the main reading unit to the second reading unit 150 if the number of times $L_a$ of usage of the first reading unit 140 satisfies Equation 1 in a relationship among the predicted lifetime usage $L_t$ of the first reading unit 140, a frequency $F_d$ used in the ADF two-sided reading mode and a frequency $F_f$ used in the flat-panel reading mode.

$$La \geq Lt[1-(Fd+Ff)], (0<Fd+Ff<1) \qquad \text{Equation 1}$$

where, the frequency $F_d$ in use of the ADF two-sided reading mode and the frequency Ff used in the flat-panel reading mode are defined as follows:

$F_d$=(the number of documents read in the ADF two-sided reading mode)/(the total number of read documents)

$F_f$=(the number of documents read in the flat-panel reading mode)/(the total number of read documents)

For example, suppose that the first reading unit 140 is the main reading unit, $F_d$=0.2, and $F_f$=0.1 (in this case, a frequency $F_s$ used in the ADF one-sided reading mode becomes 0.7). According to Equation 1, when the number of times $L_a$ of usage of the first reading unit 140 becomes [1−(0.2+0.1)]$L_t$(=0.7$L_t$), the main reading unit is changed to the second reading unit 150. Since the second reading unit 150 is used in only the ADF two-sided reading mode, the number of times $L_b$ of usage of the second reading unit 150 becomes $L_a$*0.2, that is, 0.14$L_t$ (assume that the predicted and actual lifetime usage of the second reading unit 150 is substantially equal to that of the first reading unit 140), at the time when the main reading unit is changed. In a state in which the main reading unit is changed to the second reading unit 150, the remaining lifetime usage of the first reading unit 140 becomes 0.3$L_t$ and the remaining lifetime usage of the second reading unit 150 becomes 0.86$L_t$.

When the main reading unit is changed to the second reading unit 150, the second reading unit 150 is used in the ADF one-sided reading mode and the ADF two-sided reading mode and the first reading unit 140 is used in the ADF two-sided reading mode and the flat-panel reading mode. When the frequency of each mode is considered, the remaining lifetime usage of the first reading unit 140 becomes 0.86$L_t$*[(0.1+0.2)/(0.7+0.2)], that is, about 0.29$L_t$ while the remaining lifetime usage of the second reading unit 150, that is, 0.86$L_t$, is consumed. Thus, the lifetime usages of the first reading unit 140 and the second reading unit 150 expire at substantially the same time.

The control unit 160 may change the main reading unit to the second reading unit if the number of times $L_a$ of usage of the first reading unit satisfies Equation 2 in a relationship between the predicted lifetime usage $L_t$ of the first reading unit and the frequency $F_d$ in use of the ADF two-sided reading mode.

$$L_a \geq L_t[1-(F_d+\alpha)] \qquad \text{Equation 2}$$

where, $\alpha$ denotes a constant ($0<F_d+\alpha<1$). Considering the frequency of each reading mode may vary after the main reading unit is changed to the second reading unit 150, a may be appropriately selected according to design requirements. Equation 2 may be applied when the image reading apparatus 100 does not perform the flat-panel reading function. Even when the image reading apparatus 100 performs the flat-panel reading function, Equation 2 may still be applied. In this case, a should be determined taking into consideration that the first reading unit 140 is still used in the one-sided reading mode even after the main reading unit is changed to the second reading unit 150.

As illustrated in FIG. 3, the image reading apparatus 100 according to the present general inventive concept includes an input unit 181, a display unit 182, the memory 183, and the driving unit 184.

The input unit 181 inputs information on the operation of the image reading apparatus selected by the user to the control unit 160. The user can select a reading mode such as a one-sided reading operation or a two-sided reading operation using the input unit 181. A main reading unit changing unit 181a which allows the user to input a command to change the main reading unit may be provided in the input unit 181.

The display unit 182 displays the operation state of the image reading apparatus 100 to the user. In the present general inventive concept, the control unit 160 may inform the user that the main reading unit needs to be changed and inquire of the user whether the user wants to change the main reading unit, via the display unit 182. The control unit 160 displays information on which side to be read via the display unit 182 in the ADF one-sided reading mode, after the main reading unit is changed to the second reading unit 150. The information indicates whether the side to be read is directed upward or downward when the document is laid on the document feed tray 131a.

The memory 183 stores a variety of data necessary to control the image reading apparatus. More particularly, the memory 183 stores information on the predicted lifetime usage $L_t$ of the first reading unit 140 and the total number of read documents D and data related to the number of times $L_a$ of usage of the first reading unit 140 counted in the control unit 160. That is, the memory 183 stores data necessary to compute the frequency in use of each of the reading modes, i.e., the number of documents D read in each of the reading modes (the flat-panel reading mode, the ADF one-sided reading mode and the ADF two-sided reading mode).

The driving unit 184 includes at least one motor to drive the rollers 134, 135, 136, 137 and 138 provided in the automatic document feeder 130. The driving unit 184 drives the motor under the control of the control unit 160, rotates the rollers 134, 135, 136, 137 and 138, and transports the document D on the document transporting path 133.

Figure 4:
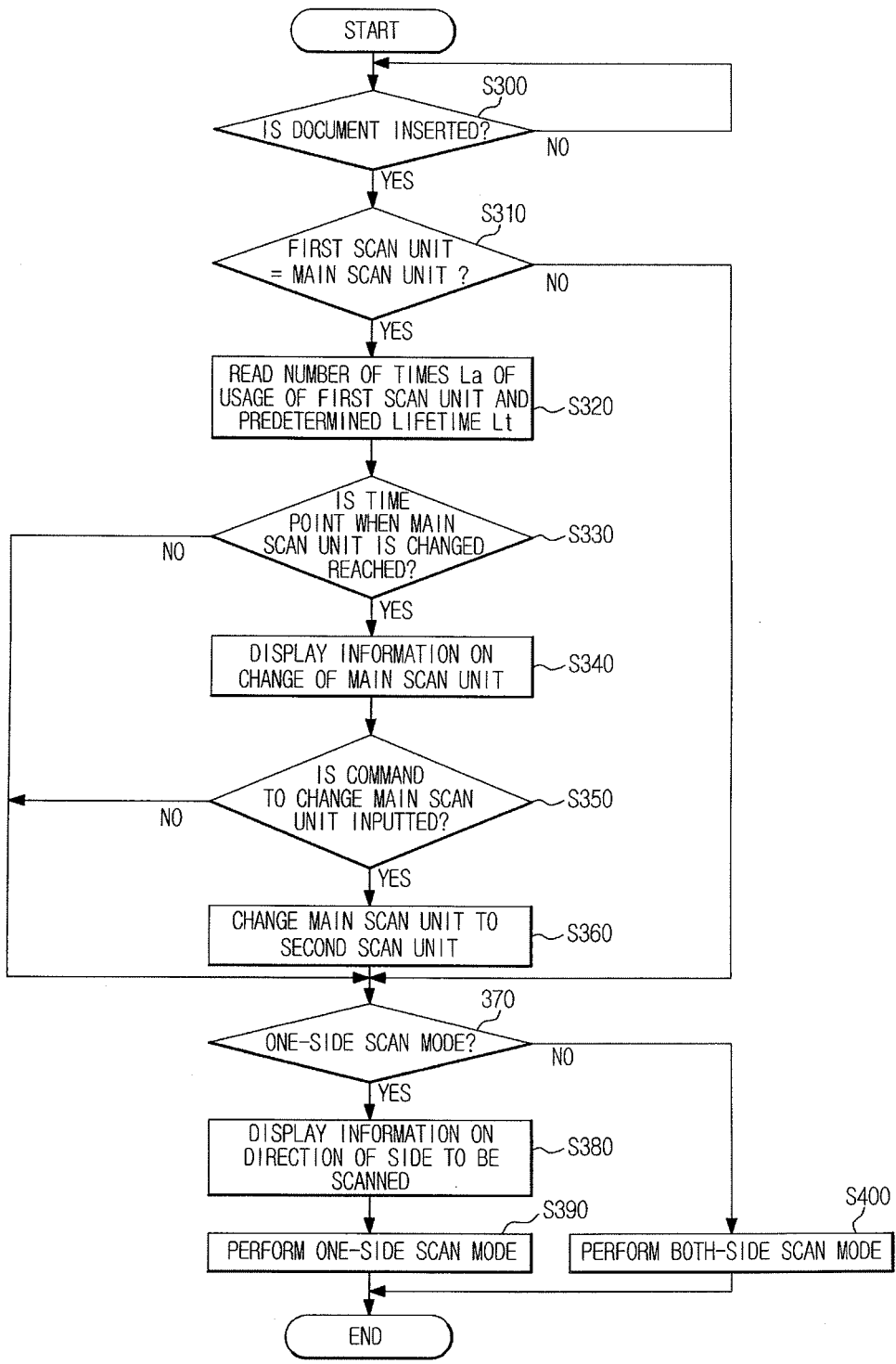
FIGS. 4 and 5 are flowcharts illustrating a method of controlling the image reading apparatus according to an embodiment of the present general inventive concept.
Figure 5:
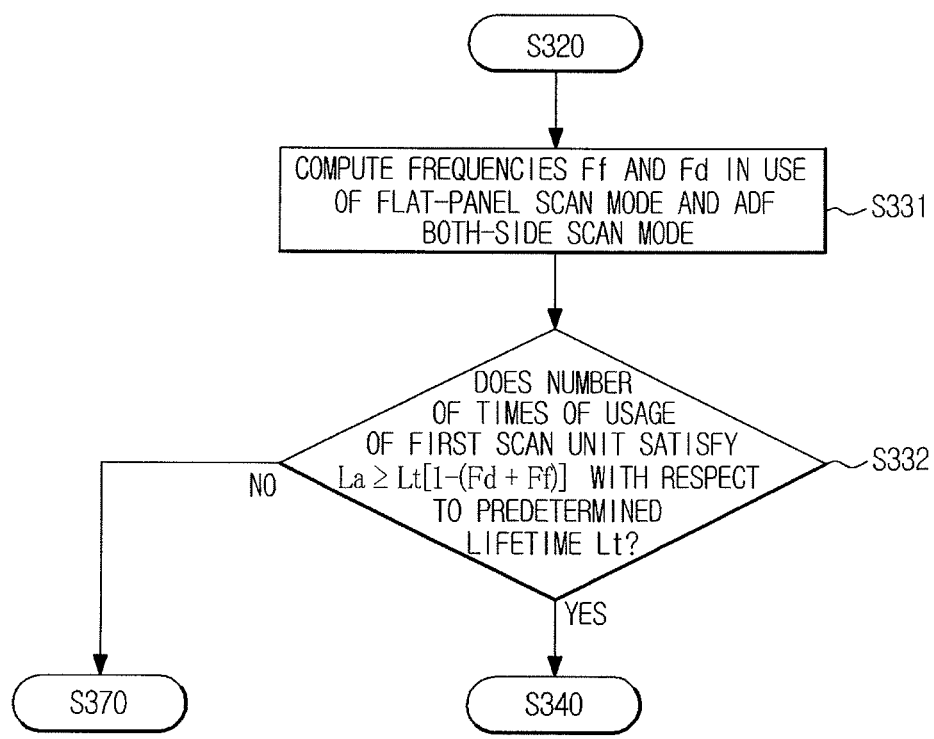

Hereinafter, a method of controlling the image reading apparatus according to the present general inventive concept will be described with reference to FIGS. 2 to 5. FIGS. 4 and 5 are flowcharts illustrating a method of controlling the image reading apparatus 100 according to the present general inventive concept.

As illustrated in FIGS. 2, 3 and 4, the control unit 160 determines whether a document D is inserted into the document insertion port 131 via a signal inputted from the document insertion detection sensor 131b (operation S300).

If it is determined that the document D is inserted, the control unit 160 checks whether the first reading unit 140 is the main reading unit (operation S310). If it is determined that the first reading unit 140 is the main reading unit, the control unit 160 reads the number of times $L_a$ of usage of the first reading unit 140, which is stored in the memory 183, and the predicted lifetime usage $L_t$ of the first reading unit 140 (operation S320).

The control unit 160 determines whether the point when the main reading unit is changed has been reached on the basis of the number of times $L_a$ of usage of the first reading unit 140 and the predicted lifetime usage $L_t$ of the first reading unit 140 (operation S330). At this time, the control unit 160 compares the number of times $L_a$ of usage of the first reading unit 140 with the predicted lifetime $L_t$ of the first reading unit 140 and determines that the point in time when the main reading unit should be changed has been reached if the number of times $L_a$ of usage of the first reading unit 140 reaches at least the predetermined percentage of the predicted lifetime usage of the first reading unit 140.

As illustrated in FIG. 5, the point when the main reading unit is changed may be determined by factoring in the frequencies of the first reading unit 140 and the second reading unit 150. The control unit 160 computes the frequencies $F_f$ and $F_d$ in the flat-panel reading mode and the ADF two-sided reading mode on the basis of data stored in the memory 183 (operation S331). Subsequently, the control unit 160 may determine that the point in time when the main reading unit is to be changed when the number of times $L_a$ of usage of the first reading unit 140 satisfies Equation 1 with respect to the predicted lifetime usage $L_t$ of the first reading unit 140 (operation S332). Similarly, the point in time when the main reading unit is changed may be determined using Equation 2.

If it is determined that the point in time when the main reading unit is changed has been reached in Operation S330 (operation S332), then the control unit 160 informs the user that the main reading unit needs to be changed and inquires of the user whether the user wants to change the main reading unit to the second reading unit 150, via the display unit 182 (operation S340).

Subsequently, the control unit 160 determines whether a command to change the main reading unit has been inputted (operation S350). If it is determined that the command to change the main reading unit has been inputted, then the main reading unit is changed to the second reading unit 150 (operation S360).

Alternatively, the control unit 160 may inform the user that the main reading unit has been changed automatically in Operation S340 and then change the main reading unit to the second reading unit 150 without performing Operation S350.

If the main reading unit is changed in Operation S360, or if it is determined that the first reading unit 140 is not the main reading unit in Operation 310, or if it is determined that the point when the main reading unit is to be changed has not yet been reached in Operation 330, or if it is determined that the command to change the main reading unit is not inputted in Operation S350, then the control unit 160 determines a reading mode selected by the user (operation S370).

If it is determined that the user selects the one-sided reading mode, then the control unit 160 displays information on the direction of the side of the document D to be read, that is, information indicating whether the side to be read is directed upward or downward when the document D is laid on the document feed tray 131a (see FIG. 1), and controls the first reading unit 140 or the second reading unit 150 to read one side of the document (operations S380 and S390).

More particularly, if it is determined that the main reading unit is changed to the second reading unit 150 in Operation S360, or if it is determined that the first reading unit 140 is not the main reading unit in Operation S310, the second reading unit 150 is the main reading unit and thus the second reading unit 150 reads one side of the document D in Operation S390. In this case, the control unit 160 instructs the user to lay the document D on the document feed tray 131a in a state to allow the second reading unit 150 to read the document D, that is, in a state in which a side to be read is directed downward.

In contrast, if it is determined that the point in time when the main reading unit is changed is not reached in Operation S330, or if it is determined that the command to change the main reading unit is not inputted in Operation S350, then the first reading unit 140 is the main reading unit and thus the first reading unit 140 reads one side of the document D in Operation S390. In this case, the control unit 160 instructs the user to lay the document D on the document feed tray 131a in a state to allow the first reading unit 140 to read the document, that is, in a state in which the side to be read is directed upward.

Meanwhile, if it is determined that the one-sided reading mode is not selected in Operation S370, then the control unit 160 controls the first reading unit 140 to read a first side of the document D and controls the second reading unit 150 to read a second side of the document D, thereby reading both sides of the document D (operation S400).

As described above, according to the general inventive concept, it is possible to equally use two reading units until the lifetime usages of the two reading units are expired, by changing a main reading unit at an appropriate point in time. Accordingly, it is possible to prevent reading quality from deteriorating when only one reading unit of a plurality of reading units is frequently used, initially. In addition, it is possible to improve convenience by allowing the user to replace the two reading units with new reading units at substantially the same point in time.

Although a few embodiments of the general inventive concept have been shown and described, it would be appreciated by those skilled in the art that changes may be made in these embodiments without departing from the principles and spirit of the general inventive concept, the scope of which is defined in the appended claims and their equivalents.

What is claimed is:

1. An image reading apparatus comprising:
an automatic document feeder;
a first reading unit to read a first side of a document fed by the automatic document feeder and to function as a main reading unit;
a second reading unit to read a second side of the document fed by the automatic document feeder; and
a control unit to operate the first and second reading units in order to perform an ADF two-sided reading mode in which both sides of the document are read, the control unit determining a point in time when the main reading unit is changed, based on a frequency in use of the ADF two-sided reading mode, and changing the main reading unit to the second reading unit at the determined point in time,
wherein the point in time when the main reading unit is changed becomes earlier at a higher frequency in use of the ADF two-sided reading mode, and
wherein the control unit changes the main reading unit to the second reading unit if a number of times La of usage of the first reading unit satisfies $La \geq Lt[1-(Fd+\alpha)]$, ($\alpha$ is a constant and $0 < F_d + \alpha < 1$)

in a relationship between a predicted lifetime usage $L_t$ of the first reading unit and a frequency $F_d$ in use of the ADF two-sided reading mode.

2. An image reading apparatus comprising:
an automatic document feeder;
a first reading unit to read a first side of a document fed by the automatic document feeder and to function as a main reading unit;
a second reading unit to read a second side of the document fed by the automatic document feeder;
a control unit to operate the first and second reading units in order to perform an ADF two-sided reading mode in which both sides of the document are read, the control unit determining a point in time when the main reading unit is changed, based on a frequency in use of the ADF two-sided reading mode, and changing the main reading unit to the second reading unit at the determined point in time; and
a flat panel on which a document to be read is laid,
wherein the control unit includes a flat-panel reading mode to read the document laid on the flat panel using the first reading unit,
wherein the point in time when the main reading unit is changed becomes earlier at a higher frequency in use of the flat-panel reading mode,
wherein the control unit determines the point in time when the main reading unit is changed, based on a frequency in use of the flat-panel reading mode, and
wherein:
the control unit changes the main reading unit to the second reading unit if a number of times $L_a$ of usage of the first reading unit satisfies $La \geq Lt[1-(Fd+Ff)]$, $(0 < Fd+Ff < 1)$ in a relationship among a predetermined lifetime Lt of the first reading unit, a frequency $F_d$ in use of the ADF two-sided reading mode and a frequency $F_f$ in use of the flat-panel reading mode.

3. The image reading apparatus according to claim 1, further comprising:
a display unit to display an operation state of the image reading apparatus,
wherein the control unit displays information on the change of the main reading unit on the display unit before the main reading unit is changed to the second reading unit.

4. The image reading apparatus according to claim 1, further comprising:
a display unit to display an operation state of the image reading apparatus and a document feed tray on which the document fed by the automatic document feeder is laid,
wherein the control unit displays information on a direction of a side to be read in the document laid on the document feed tray when the main reading unit is changed to the second reading unit.

5. A method of controlling an image reading apparatus, including a first reading unit to read a first side of a transported document and to function initially as a main reading unit and a second reading unit to read a second side of the transported document, the method comprising:
electronically calculating a frequency $F_d$ of apparatus use for an ADF two-sided reading mode to read the first side and the second side of the document using the first reading unit and the second reading unit, respectively;

determining a point in time when the main reading unit is changed, based on a frequency in use of the ADF two-sided reading mode;

changing the main reading unit to the second reading unit at the determined point in time;

predicting a liftetime usage (Lt) of the first reading unit;

predetermining a constant α for use in electronic calculations with $F_d$; and determining whether a total usage $L_a$ of the first reading unit has exceeded a threshold value according to the formula $$La \geq Lt[1-(Fd+\alpha)], 0<Fd+\alpha<1.$$

6. The method according to claim 5, wherein the apparatus has a flat-panel reading function performed by the first reading unit and the predetermination of α takes into account the flat-panel reading function.

7. A method of controlling an image reading apparatus, including a first reading unit to read a first side of a transported document and to function initially as a main reading unit and a second reading unit to read a second side of the transported document, the method comprising:

electronically calculating a frequency $F_d$ of apparatus use for an ADF two-sided reading mode to read the first side and the second side of the document using the first reading unit and the second reading unit, respectively;

determining a point in time when the main reading unit is changed, based on a frequency in use of the ADF two-sided reading mode;

changing the main reading unit to the second reading unit at the determined point in time;

predicting a liftetime usage (Lt) of the first reading unit;

electronically calculating a frequency $F_f$ of use for a flat panel reading mode to read the first side of the document using the first reading unit; and determining whether a total usage $L_a$ of the first reading unit has exceeded a threshold value according to the formula $$La \geq Lt[1-(Fd+Ff)], (0<Fd+Ff<1).$$

* * * * *